(No Model.)
H. N. THAYER.
WHEEL.
No. 396,783.  Patented Jan. 29, 1889.
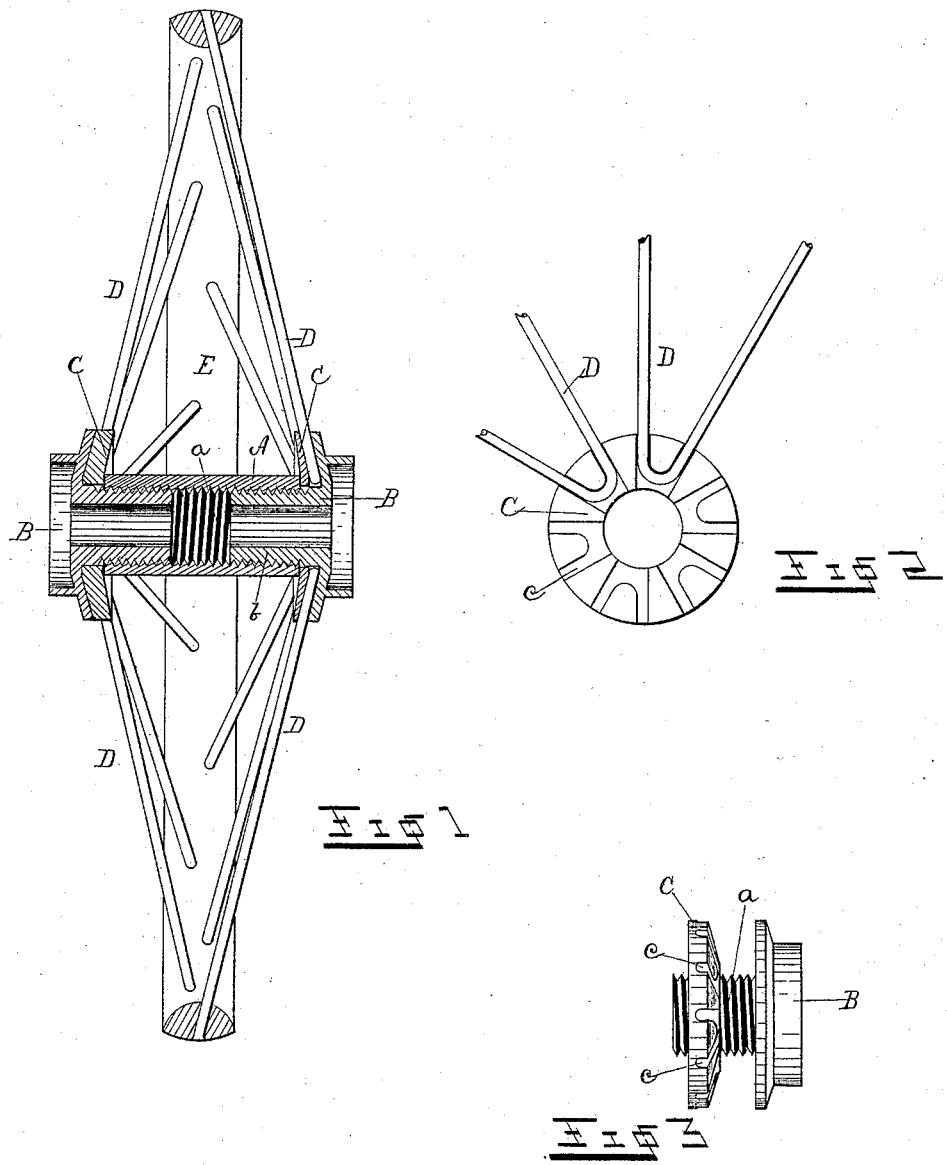

UNITED STATES PATENT OFFICE.

HORACE N. THAYER, OF ERIE, PENNSYLVANIA.

WHEEL.

SPECIFICATION forming part of Letters Patent No. 396,783, dated January 29, 1889.

Application filed October 25, 1888. Serial No. 289,148. (No model.)

*To all whom it may concern:*

Be it known that I, HORACE N. THAYER, a citizen of the United States, residing at Erie, in the county of Erie and State of Pennsylvania, have invented certain new and useful Improvements in Wheels; and I do hereby declare the following to be a full, clear, and exact description of the invention, such as will enable others skilled in the art to which it appertains to make and use the same.

My invention relates to wheels; and it consists in certain improvements in the construction thereof, as will be hereinafter fully described, and pointed out in the claim.

The invention is illustrated in the accompanying drawings, as follows: Figure 1 is a vertical section on the plane of the axis of the wheel. Fig. 2 is an elevation view of the inner face of the flanges C. Fig. 3 is an elevation view of the parts B and C.

The construction is as follows:

A is the hub-barrel. It has an internal screw-thread, *a*, and a plane exterior surface.

B are flanged bushings or boxes, which screw into the ends of the hub-barrel.

C are the spoke holding flanges. They fit onto the flanged bushing and are clamped against the ends of the hub-barrel by the screw *b* on the flanged bushing. The flanges C are provided on their inner faces with V-formed grooves *c*, sunk in the surface.

D are the spokes, which are formed of rods bent into V shape, and have their bent ends placed in the V-shaped grooves in the flanges C, as shown in Fig. 2. The grooves C, which receive the spokes, are of sufficient depth to allow the spokes to be received by them, and set flush with the surface of the flange-face, so that the spokes will be clamped by the flange of the bushing B, when the inner surfaces of the two flanges are brought together.

What I claim as new is—

In a wheel, the combination of the internally-screw-threaded hub-barrel A, the flanged bushings or boxes B, screwed into the hub-barrel, the spoke-holding flanges C, fitting on the boxes B at the ends of the hub-barrel and having grooves *c* in their inner surfaces to receive the bent ends of the spokes D.

In testimony whereof I affix my signature in presence of two witnesses.

H. N. THAYER.

Witnesses:
JNO. K. HALLOCK,
WM. P. HAYES.